United States Patent [19]

Björhaag

[11] 4,226,820
[45] Oct. 7, 1980

[54] METHOD OF AND APPARATUS FOR FORMING AN ARTICLE FROM A MIXTURE OF A SOLIDIFYING PLASTIC MATERIAL AND A LARGE PORTION OF FILLER MATERIAL

[75] Inventor: Georg Björhaag, Åmål, Sweden

[73] Assignee: Svensk Härdbetongteknik AB, Bromma, Sweden

[21] Appl. No.: 924,672

[22] Filed: Jul. 14, 1978

Related U.S. Application Data

[63] Continuation-in-part of Ser. No. 493,125, Jul. 30, 1974, abandoned.

[30] Foreign Application Priority Data

Jul. 30, 1973 [SE] Sweden .................................. 7310463

[51] Int. Cl.³ .............................. B29G 1/00; B29J 5/04
[52] U.S. Cl. ........................................ 264/72; 425/421
[58] Field of Search ............................ 264/72; 425/421

[56] References Cited

U.S. PATENT DOCUMENTS

| | | | |
|---|---|---|---|
| 2,407,168 | 9/1946 | Lindkvist | 425/421 X |
| 2,434,477 | 1/1948 | Winter | 264/245 X |
| 2,526,174 | 10/1950 | Ukropina | 264/72 |
| 2,706,322 | 4/1955 | Davies | 264/71 |
| 4,079,109 | 3/1978 | Helmrich | 264/72 |

Primary Examiner—Thomas P. Pavelko
Attorney, Agent, or Firm—Frishauf, Holtz, Goodman & Woodward

[57] ABSTRACT

A method of and apparatus for the manufacturing of products of plastic to which a filler preferably of wood material has been added to a high degree as described. A thermosetting or otherwise solidifying plastic compound has finely divided filling material distributed therein so that a mixture is obtained. The mixture is introduced into a mold and is pressed by a ram adapted to the shape of the product. The mixture in the mold is subjected to vibrations of a special form provided from synchronized vibrations.

20 Claims, 21 Drawing Figures

METHOD OF AND APPARATUS FOR FORMING AN ARTICLE FROM A MIXTURE OF A SOLIDIFYING PLASTIC MATERIAL AND A LARGE PORTION OF FILLER MATERIAL

REFERENCE TO RELATED APPLICATION

This application is a continuation-in-part application of a patent application of George Bjorhoag entitled "Method for the Manufacturing of Products of Plastic to which a Filler, preferably of Wood Material, has been added to a High Degree" filed on July 30, 1974 now abandoned under Ser. No. 493,125. The disclosure of the prior application is incorporated herein in its entirety by reference

BACKGROUND OF THE INVENTION

The present invention relates to a method of manufacturing products of plastic to which a filler preferably of wood material has been added to a high degree more particularly, the invention relates to such a method in which a thermosetting or otherwise solidifying plastic compound, aggregated with finely divided filling material, so that a mixture is obtained, is introduced into a mould, in which it is subjected to pressure in order to shape the desired product. The invention also relates to apparatus provided for carrying out the above-mentioned method.

Plastic material has turned out not to be suitable for the production of solid or thickwalled articles of large dimensions, by way of example certain products for the building industry, as window frames, window sashes, doors, door frames and moreover objects of interior decoration, due to the high price per cubic unit compared with conventional materials such as wood and particle board. However, it would be desirable in connection with such products to be able to exploit the excellent characteristics of plastics from a maintenance and appearance point of view and because of its good shaping quality, so that casting methods might be substituted for the hitherto common and more expensive chip cutting machining methods.

As is the case by production of particle boards, a solution of the problem involves letting the plastic material comprise a relatively small proportion of the articles, the balance comprising fillers like sawdust, woodchips, cutter shavings, coarse woodpulp and/or the like. However, it has turned out that a mixture containing an adequate amount of filling material in order to satisfy a sufficiently low price is not ductile enough to permit the use of conventional die casting methods for the technique of plastics.

SUMMARY OF THE INVENTION

It is an object of the invention to provide a possibility of utilizing a mixture of plastics and aggregate, in which the proportion of aggregate can be greater than what is possible in connection with injection moulding methods. By such an arrangement the proportion of plastics entering into the mixture could entirely be determined on the basis of the required strength without having to consider the requirements of a conventional processing method.

It is another object of the invention to provide a possibility to utilize moulds, which in the plant permit the manufacture of products of complicated shape, by way of example products with undercuts and/or greatly varying thickness, and also to make it possible to product articles from the material mentioned in the background portion of this application within a wide range of types of the same.

The objects of the invention are achieved by means of a combined pressing and vibrating technique in which a mixture of plastic material and aggregate is placed into a mould and pressed by a ram adapted to the shape of the product, the mixture being subjected to vibrations of a special form from synchronized vibrators according to the invention.

DETAILED DESCRIPTION OF THE PREFERRED EMBODIMENTS

Figure 1:
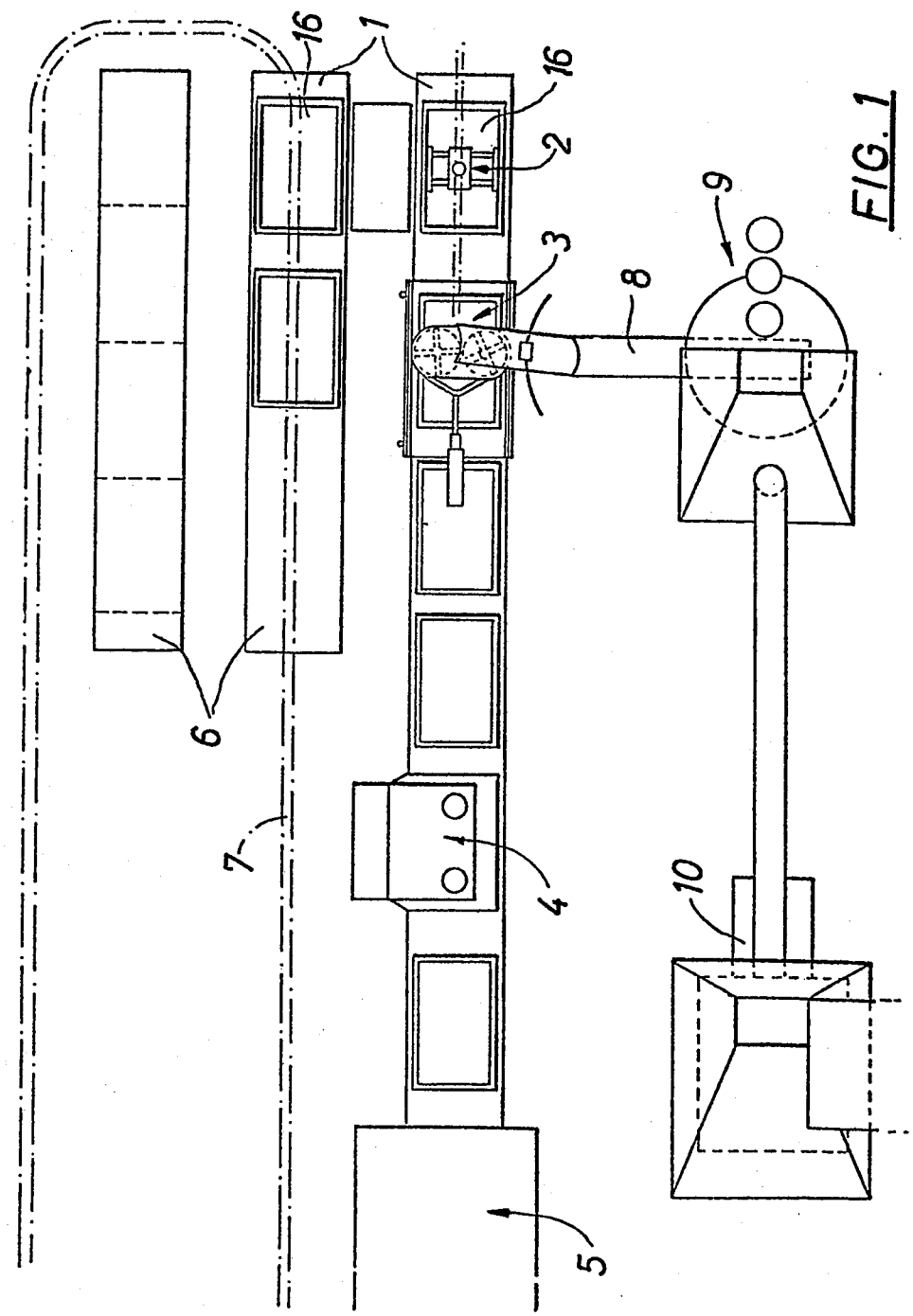
In FIG. 1 a part of a plant utilizing the present invention is shown in a top plan view.

According to FIG. 1, the plant includes a conveyor track 1 connected to an opening station 2 for the mould, a filling station 3 for the same, a pressing station 4, and a curing station 5. The conveyor track 1 works in direction from the station 2 towards the station 5.

After the station 5, which includes a heating tunnel for the curing of plastic, there are stations for cooling, breaking up of the moulds, and subsequent treatment as finishing of the products, providing the same with fittings and so on. The conveyor track 1 can be fed at the station 2 from a storage and preparation station 6 for the moulds, which station by means of a conveyor 7 communicates with the mould breaking station mentioned, but not illustrated. Devices for the preparation of the mixture, a mixing device 9, and ahead of the latter one a drying device 10 for the aggregate communicate by means of a conveyor 8 with the filling station 3.

Figure 2:
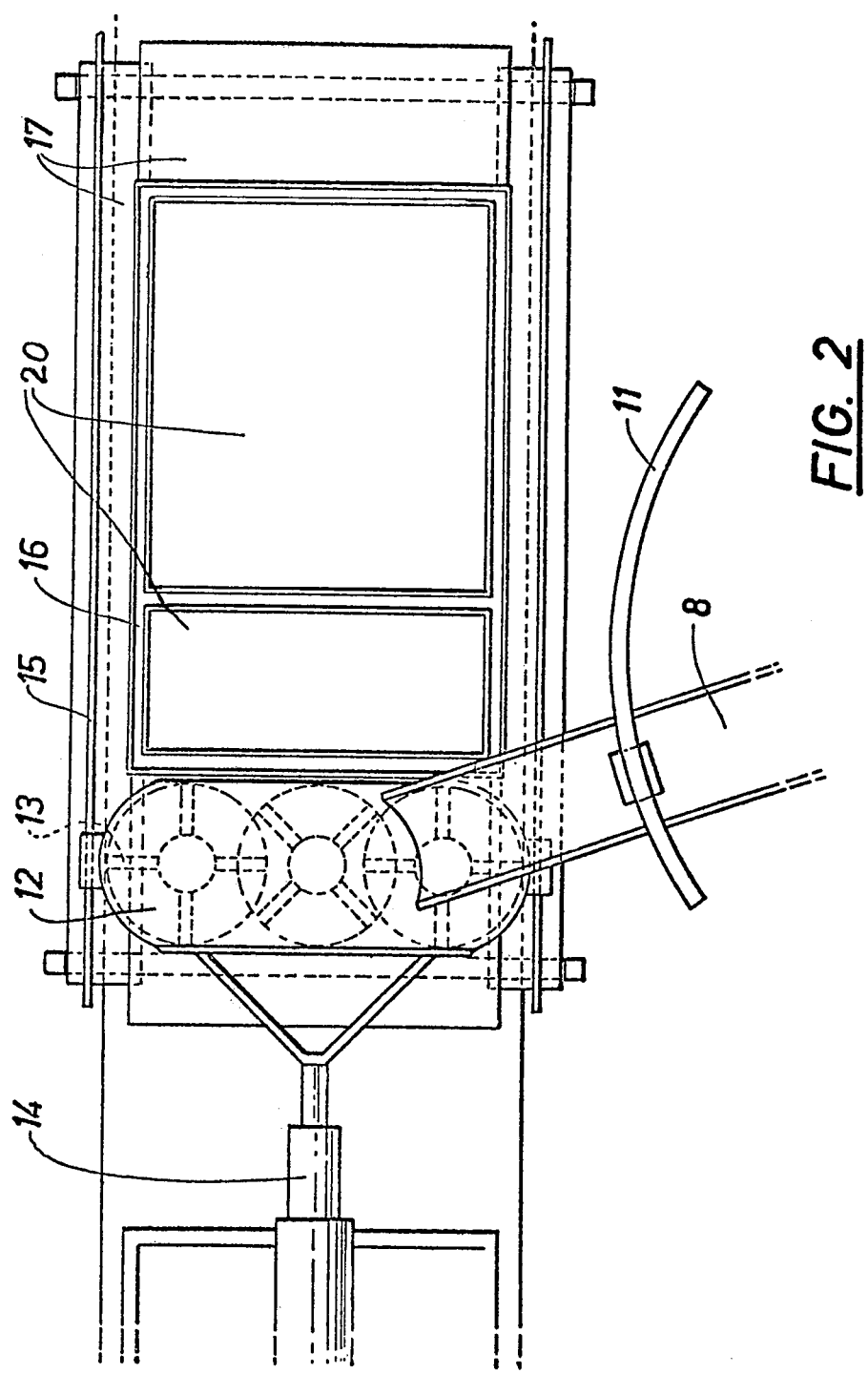
In FIG. 2 a portion of the plant of FIG. 1 is shown on an enlarged scale.

The filling station 3 is illustrated more in detail in FIG. 2, the conveyor 8 being visible and as is evident from the figure it can be pivoted along a curbed rail 11. The conveyor 8 terminates above a distribution hopper 12 exhibiting a number of rotatable mixers 13. The distribution hopper 12 is arranged by virtue of a power cylinder 14 to be moved back and through along rails 15, which are placed above a location point for a mould 16, which as illustrated is surrounded by boards 17 arranged flush with its upper edge. The mould 16 is entirely open upwards by vitue of openings 20, leading to the cavities of the mould.

Figure 3:
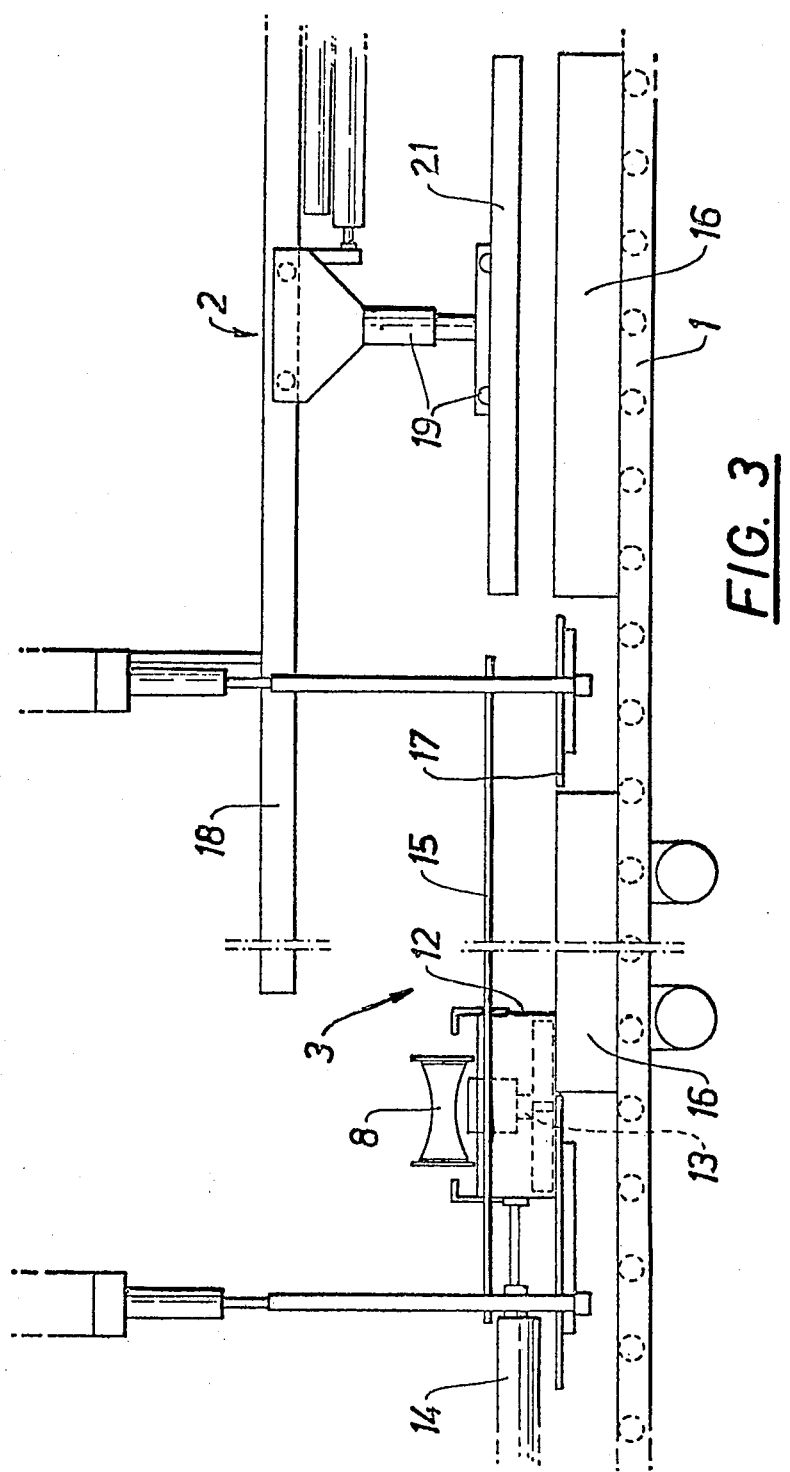
In FIG. 3 a portion of the plant of FIG. 1. is shown in side elevational view.

The arrangements in the filling station 3 are illustrated in side elevational view in FIG. 3, in which figure the details mentioned can be seen. In addition the mould opening station 2 is shown, which comprises an elevating gripping device 19 mounted on a transfer track 18 along the conveyor 1. The latter is provided to transport the open mould 16. The gripping device 19 is provided to lift a ram 21 upon completing the moulding out of the opening 20 (FIG. 2) of the mould 16.

Figure 4:
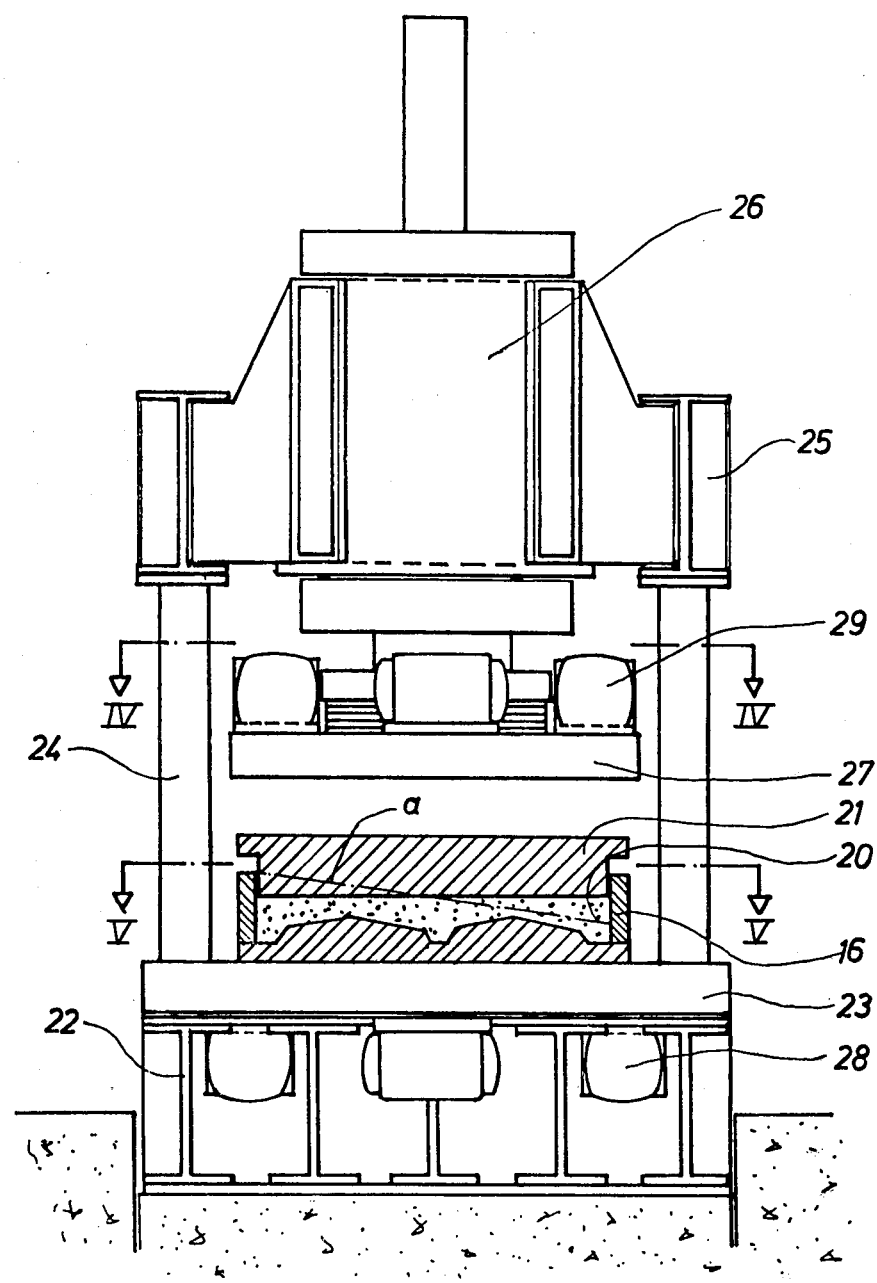
In FIG. 4 a press according to the present invention is shown in side elevation.

According to FIG. 4 the press comprises a frame with a carrying portion 22, a working table 23 and four pillars 24, connected directly to the carrying part 22 and not to the table 23, carrying an upper portion 25. The upper portion 25 includes a heavy hydraulic jack 26 with a piston carrying a pressing head 27. The working table 23 as well as the pressing head 24 are connected to the carrying portion 22 and the piston of the jacket 26 by elastic blocks. Attached to the working table 23 and to the pressing head 27 are vibrators 28 and 29 respectively. As is to be described below the working table 23 is intended to carry a mould 16 in the opening 20 of which a ram 21 is inserted. The ram 21 is intended to cooperate with the pressing head 27 by lowering the same by use of the hydraulic jack 26.

Figure 5:
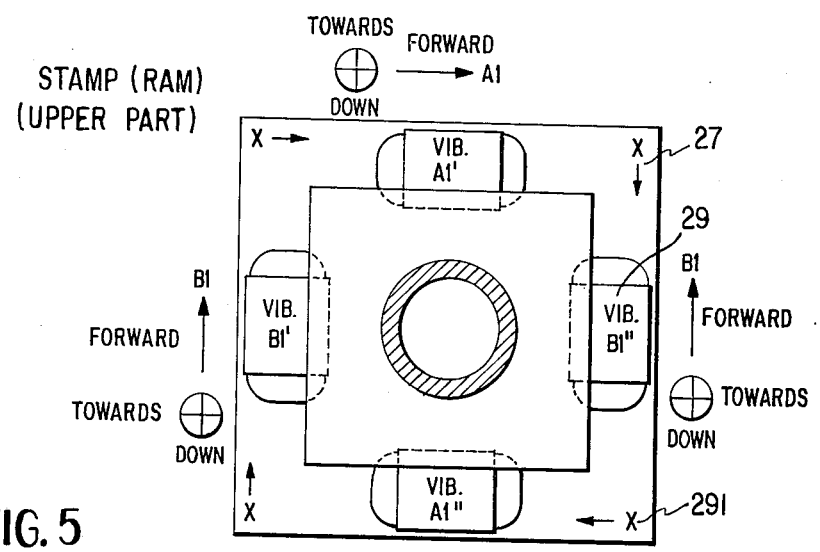
In FIGS. 5 and 6 the press of FIG. 4 is shown respectively in two vertical cross sectional views, the sections being taken along lines V and VI in FIG. 4, respectively.
Figure 6:
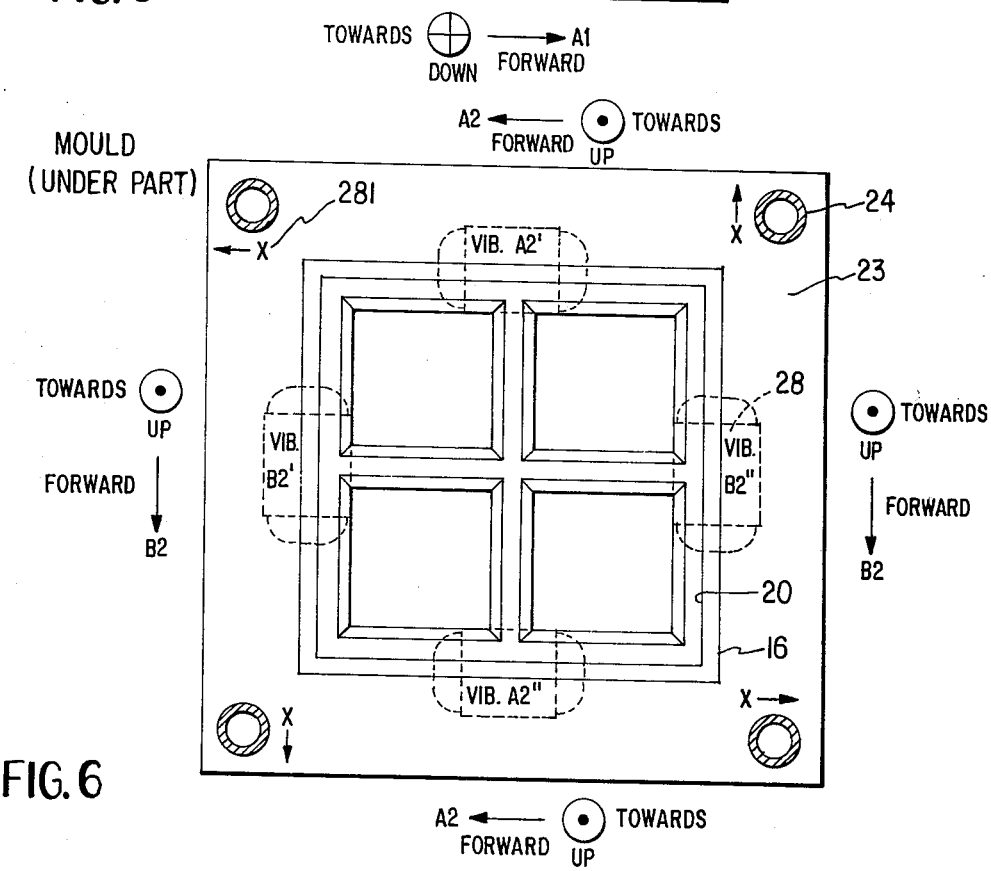

The pressing head 27 with the vibrators 29 shown from above in FIG. 5 in a section along the line V—V in FIG. 4. The working table 23 is shown in FIG. 6 in a section along the line VI—VI in FIG. 4. The positions of the vibrators 28 at the underside of the table 23 is shown. The mould 16, without the ram 21 inserted, is shown in FIG. 6 placed on the table 23. As is evident from FIGS. 5 and 6 the table 23 and the pressing head 27 are each provided with four vibrators 28 and 29 respectively, with two having their axes parallel to one another and in right angle relationship to the axes of the two remaining vibrators.

Figure 7:
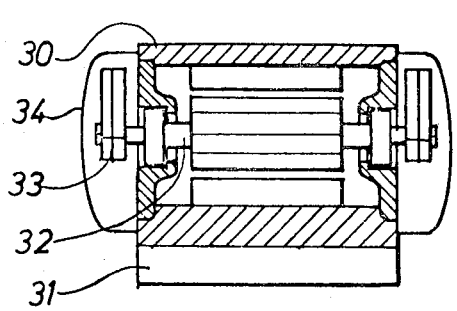
FIGS. 7 and 8 show respectively, in a vertical cross sectional view and a side elevation a vibrator for the press of FIGS. 4–6.

A side elevation of a vibrator is shown in FIG. 7. According to this figure the vibrator includes a casing 30 with a mounting plate 31. The casing 30 is enclosing a synchronous electrical motor, the shaft 32 of which at its ends is provided with unsymmetrical weights 33. The weights 33 are coverred by respective hoods 34. At each end of the shaft 32 there are two weights 33 provided which are turnable relative to one another. However, by turning the weights 33 it is possible to maintain them positioned in the same angular positions at both ends of the shaft 32.

The several vibrators associated with the table 23 and the head 27 should be synchronized. One way to accomplish this would be to use synchronus motors which are started at the same time, after the weights associated with them are positioned in the desired phase relationships. Of course, mechanical synchronization by means of shafts, belts, chains and the like could be used.

Figure 8:
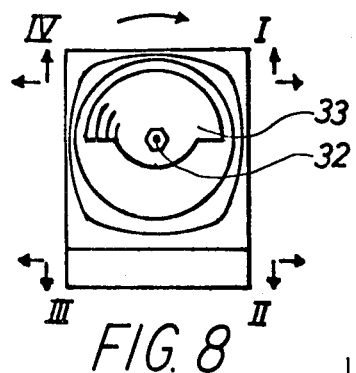

With respect to desired phase relationships, reference being made to FIGS. 5–8, where an article of relatively simple shape is to be formed, it can be noted that the rotating vibrator of the art shown in FIGS. 7, 8 develops forces (blows) providing the mould or ram the following movements:

Forward movement in the intended moving direction of the mixture,

Backward movement in the opposite direction,

Three forward and backward movements are crosswise to the pressing direction,

Toward movement with the surfaces of the mould or stamp moving towards the mixture, i.e., the mould is moving upwards and the stamp downwards, Away, movement of the surfaces of the mould or stamp away from the mixture, i.e. the mould is moving downwards and the stamp upwards, and Downwards and upwards means in the pressing direction.

Through the inertia of the mould and the ram respectively, the surfaces will be pressed towards the mixture during the main part of the forward movement and are moving away from the mixture during the main part of the backward movement. This effect results in the transportation of the mixture in the intended moving direction.

The vibrators are placed in such a way, reference being made to FIGS. 5 and 6, that forward movement will occur in four directions all of them crosswise to the pressing direction. The "forward directions" are the following:

A1, the stamp is moving in the first direction

B1, the stamp is moving in the second direction in right angle to A1

A2, the mould is moving in the first direction opposite A1

B2, the mould is moving in the second direction in right angle to A2 and opposite to B1.

The best results will be obtained in most cases by the following phase relationship:

The vibrators creating the blows A1 and A2 which should be in phase to each other The vibrators creating the blows B1 and B2 should be in phase to each other but out of phase to A1 and A2 with a half period.

This arrangement can be scheduled in the following way (see the marking of the vibrators in FIGS. 5,6):

| Vibrators Ram | | Mould | | |
|---|---|---|---|---|
| A1' | B1' | A2' | B2' | |
| A1" | B1" | A2" | B2" | |
| Towards (Down) | Away (Up) | Towards (Up) | Away (Down) | 1/2 period |
| Forwards (Dir.A1) | Backwards | Forwards (Dir.A2) | Backwards | |

-continued

| Vibrators | | | | |
|---|---|---|---|---|
| Ram | | Mould | | |
| A1' | B1' | A2' | B2' | |
| A1" | B1" | A2" | B2" | |
| Away (Up) | Towards (Down) | Away (Down) | Towards (Up) | 1/1 period |
| Backwards | Forwards (Dir.B1) | Backwards | Forwards (Dir.B2) | |
| Towards Forwards | Away Backwards | Torwards Forwards | Away Backwards | |

As mentioned this arrangement is the optimal in most cases but not in all cases. By certain shapes of the mould some changes in the arrangement can be suitable.

The vibrator is shown from the end in FIG. 8 (the hood 34 removed). As will be understood from this figure the vibrator and the body to which the vibrator is attached will be subjected to a rotating force produced by unbalanced weight 33. The unbalance of the pair of weights at each end of the shaft 32 and consequently this force is adjustable by means of turning the weights 33 of each pair relatively to one another. The maximum unbalance is obtained in the position shown in FIGS. 7, 8, with the weights 33 aligned while, if the weights of each pair were turned to a position opposite to each other, the unbalance would be neutralized.

The forces produced by the rotating weights are directed in the way indicated in FIG. 8, accordingly to the right in the quadrants I, II, to the left in the quadrants III, IV, upwards in the quadrants IV, I, and downwards in the quandrants II, III. If the vibrator is attached to the working table carrying a mould containing the mixture the upwards force in the quadrants I, IV results in a packing of the mixture and the downward forces in the quadrants II, III will result in a loosen up of the mixture. According to the inertia of the mixture the same will be mostly packed when the weight passes the quadrants I, II. In these quadrants the forces work to move the mould to the right and according to the inertia of the mixture the same will be pressed against the inner surfaces of the mould pointing to the right, i.e., the mixture will be pressed against the left walls of the mould.

In this way it is possible to direct the packing of the mixture in the desired way by means of the arrangement of the vibrators. According to the arrows in FIG. 6, the vibrators 28 of the working table 23 in the illustrated embodiment are so arranged, that the mixture is packed along the to the right pointing respectively the upwards pointing walls of the mould 16. The arrangement of the vibrators 29 of the pressing head 27 is so chosen that the packing effect is reversed compared to the same of the working table. Consequently, the ram of the mould produces a packing effect towards the inner walls of the mould pointing to the left and downwards.

By means of the described technique it is consequently possible to obtain a packing of a mixture along the walls of the mould independent of the direction of the wall. This effect is very important; by a pressing operation i.e. by pressing the ram down in the with mixture filled mould, the pressure in the mixture is directed substantially in the pressing direction of the ram and because of the high friction between the particles of the mixture the pressing pressure will not produce a pressure of the mixture against the walls of the moulds extending in the direction of the pressing movement great enough to produce the desired strength and smooth surface finish of the parts of the workpiece which are adjacent to the surfaces formed by said mould walls. However, by virtue of the described vibrating techniques it is possible to obtain articles of a substantially equal strength and surface finish, also articles of very complicated shape, while using the mixture containing a filler in a high degree.

It is possible to further increase the results by using different frequencies for the vibrators. According to practical apparatus for carrying out of the method the blowing frequence for the vibrators of the upper part of the mould is according to the following:

Position A1' and A1" = 8900 blows per minute, and
Position B1' and B1" = 6000 blows per minute.

These relatively high frequences are to be used for vibrators of the upper portion of the mould according to FIG. 5 while for the under part of the mould according to FIG. 6 the following lower frequencies are porposed:

Position A2' and A2" = 2900 blows per minute, and
Position B2' amd B2" = 2600 blows per minute.

Under some circumstances it is however more suitable to change the arrangement so that the lower frequences are used for the upper portion of the mould and the higher frequencies for the under portion of the mould. The most suitable arrangement depends on the compound chosen for the moulding. By concrete the best result will occur if the higher frequences are directed towards the under part of the mould while by plastic compound with wood filling material it is more suitable to use the higher frequences for the upper part of the mould. It is generally necessary to determine the frequences to be used by means of practical experiments and the arrangement to be used is depending on the compound as well as the design of the mould, the examples given above being exemplary only.

In order to reach the most suitable arrangement the vibrators consequently have to be adjustable according to frequence and the direction of the blows. Vibrators driven by synchronus motors intended to work at the same frequency need not be synchronized in mechanical or electrical way. In practice it is shown that if the vibrators are adjusted to work about the same frequency they will be self-synchronizing by means of the blows transformed by the base. In the drawings the vibrators are placed in front of the center of the mould, but positioning at the corners of the mould base is also possible.

Figure 10:
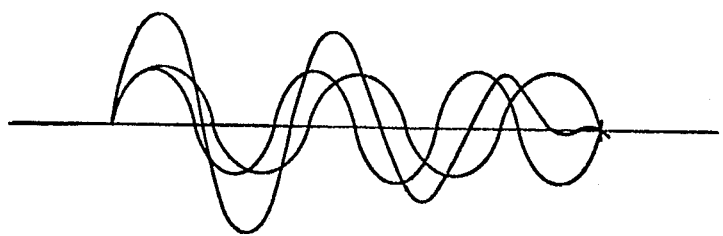
FIG. 10 is a graphic representation of vibrations of different frequencies.

How the use of different frequences at the same time would influence the effect of the blows (the amplitude) is shown in FIG. 10 in which figure two sine curves of different frequencies are added. The additional will, as shown, result in a periodical increasing of the amplitude in that moment when the blows are directed in the same way. By practical experiments it is shown that this periodical change of the blowing effect will result in an exceptional flowability and packing of the compound and mixture. In practice the described method is very advantageous and by using the same it has been possible to manufacture finished work pieces with very varying thickness in the material and, in spite of this, with practically the same density in the different portions thereof. Work pieces manufactured using conventional techniques by which the special vibrating technique according to the invention is not used the density in the different portions would be very different and in thick portions cavities also will likely occur.

The advantages obtained by using the invention are in the main the result of an intensive experimental work during a long period of time, which work is based on certain theories and feed-back of the experimental results. The theory relating to the use of vibrations of different frequence and direction at the upper and the under part of the form is founded on the assumption that particles with different mass are influenced in different ways by different frequences and it is assumed that the same is the matter in regard to different amounts of compounds enclosed in cavities of the mould with different volume.

The following description is an example how the method according to the invention can be carried out:

1. The under form is filled to the intended depth with the mixture composed of the plastic compound and aggregate. The mould is suitably vibrated during this filling which will shorten the necessary time. Alternatively, the vibration can be initiated after the filling and it is usually necessary to proceed with the vibration after the intended amount of compound mixture in the mould. From experiment it is shown that the vibrations with the compound and aggregate free in the under part of the mould and not enclosed between the mould portions will give an inclined upper surface of the mixture as shown in FIG. 4 (line a in the mould part 16).

2. The upper part of the mould is lowered towards the free surface of the mixture in a relatively slow cycle (extended to tens of seconds). By means of the synchronized vibrations and the pressure from the upper part of the mould the mixture is equally distributed in the mould. During the pressing of the upper part of the mould against the mixture the definite distribution of the mixture in the mould is carried on and the mixture will be packed together so that all of the trapped air will be removed.

3. After a period of vibrating under relatively low pressure the mould is subjected to the desired pressure for the pressing of the product (a pressure in the range of thousands of N (Newtons) depending on the size of the mould) and the ultimate compression of the mixture occurs.

4. Now the mould with the upper part remaining in the under part (or stamp/pressing head) is removed from the press and transported to a place in which the product is hardened (cured). If a thermosetting plastic compound were used the curing is effected during heating in a heat chamber (kiln).

In the text below the moulding including filling of the mould in an adequate way by manufacturing products of different shapes is described.

Figure 9:
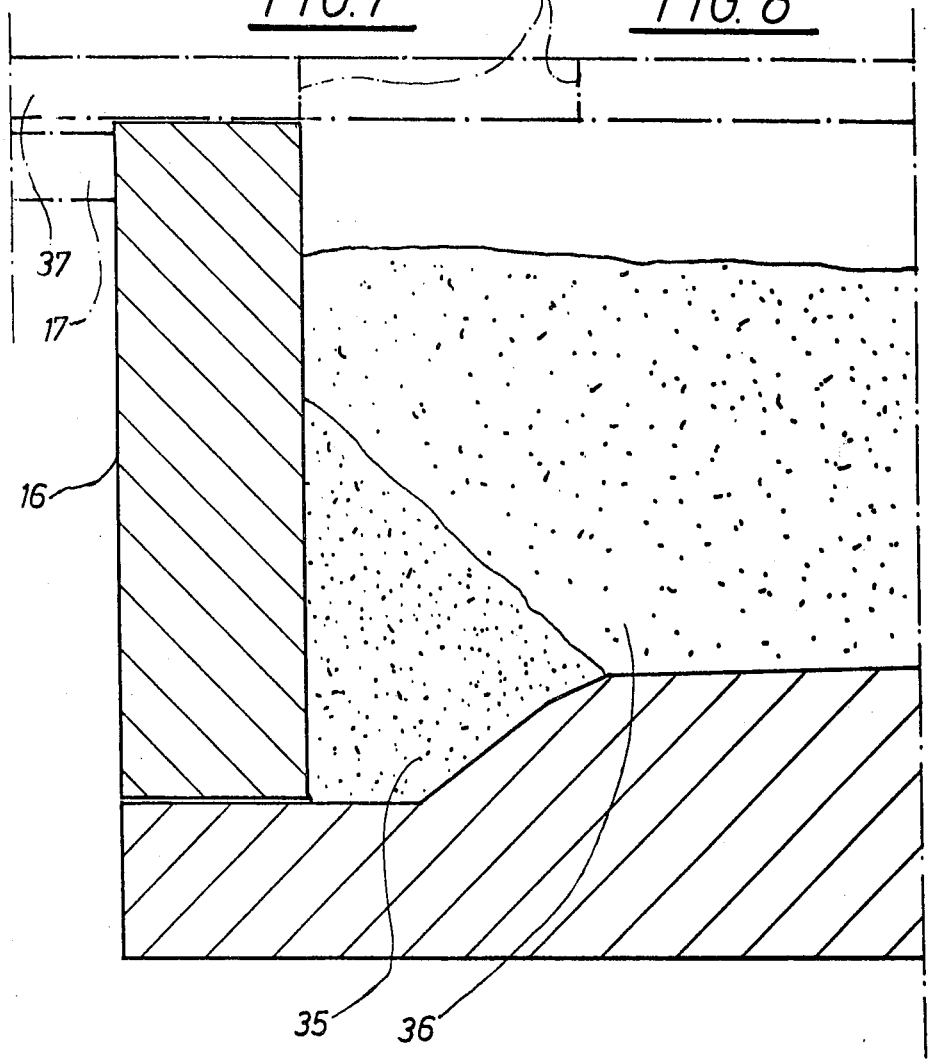
FIG. 9 shows in a partial sectional view a mould for the plastic compound mixture.

In FIG. 9 a portion of a mould 16 is shown. As indicated the mould contains mixture of unequal density, adjacent to the vertical wall of the mould a mixture of 35 with high density and against the middle of the mould a mixture 36 with lower density. For the distribution of the mixture 35 a board 37 with suitable openings 38 is provided. After that the mixture 35 has been filled along the walls of the mould through the openings 38 in the way described below, the board 37 is removed and the mixture 36 is filled through the uncovered opening 20 of the mould. By packing the mixture in the described way by means of vibrating the mixture 35 with the higher density it will be tighter packed. By this method it is possible to decrease the strength of the boarder portions of the produced article and to become sufficiently packed even if the walls of the moulds extend in the pressing direction and even if undercuts are present.

Figure 11:
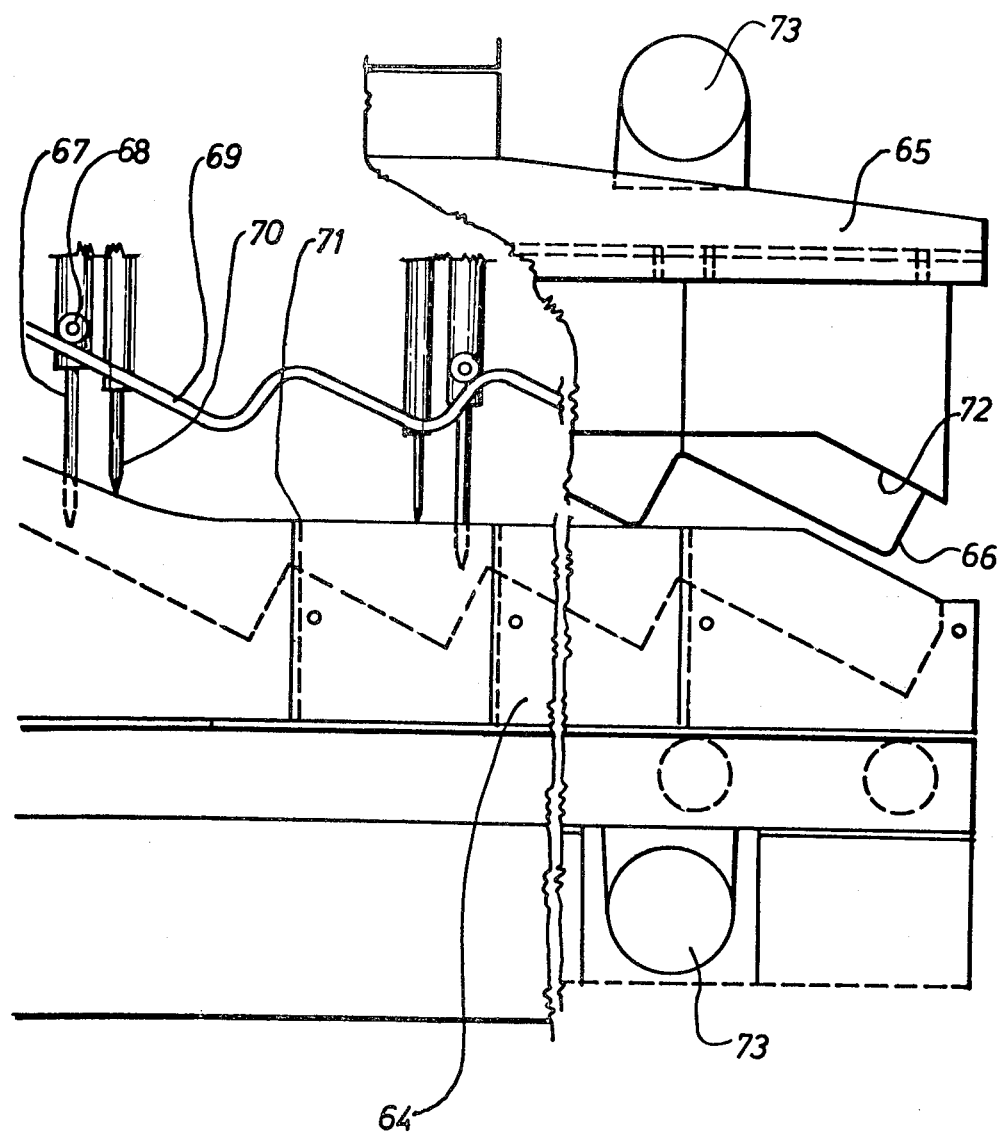
In FIG. 11 a moulding device for staircases pressed into one whole unit is shown, a mould filling machine being illustrated in the left part of the figure and a pressing tool in the right part thereof.

In FIG. 11 a broken view of a machine for casting of staircases is shown. To the left in the figure a mould filling device and the lower half 64 of a casting mould are shown, while to the right in the figure the lower half 64 of the mould is shown together with a ramming head 65 and an upper half 66 of a mould. The lower half 64 of the mould exhibits a bottom shape like steps and the upper half 66 of the mould has a corresponding shape. At the side of the mould halves there are the string boards accordingly flanges at right angles to the steps. Unless special precaution is taken, the casting mixture, when filled, would exhibit a considerable variation with respect to its thickness in the step-shaped lower half 64 of the mould, but this is taken care of by leveling by means of a scraping and distributing device according to what is shown to the left in FIG. 11. The device is provided with a number of scrapes or knives 67, which can be displayed along the mould and during their displacement movement are guided as to their height position by rollers 68 against a guiding rail 69. The knives 67 extend only unto the position for the string boards. The knives 67 thus are supported in such a manner that they tend to occupy a lower position determined by the rollers 68 at their movement along the rail 69. The knives 67 extend only unto the position for the string boards, and the upper surface for the mixture in these is shaped by additional knives 70, which are guided by the edge 71 of the lower half of the mould. The top surface of the string boards are shaped at the pressing of the surface 72 against the upper half 66 of the mould.

By substituting the rails 69 adapting them to the surface of the lower half of the mould, the machine can be used for a great many different types of shapes, in connection with which the upper surface of the mixture is filled into the mould because of circumstances connected with the pressing operation cannot be plane, before the ram is brought down.

As is evident from the figure, the bed of the lower half of the mould as well as the pressing head 65 are provided with vibrators 73. The vibrators 73 are provided to vibrate the plastic-filler composition before and during the pressing operation in order to distribute the composition in all the cavities of the mould, and to give a precompression and bring air-inclusions to collapse as described before. By modeling of the free surface of the compound the vibrations must not be too intensive before the lowering of the upper part of the mould, because the vibrations in that case will level out the free surface of the compound.

Figure 12:
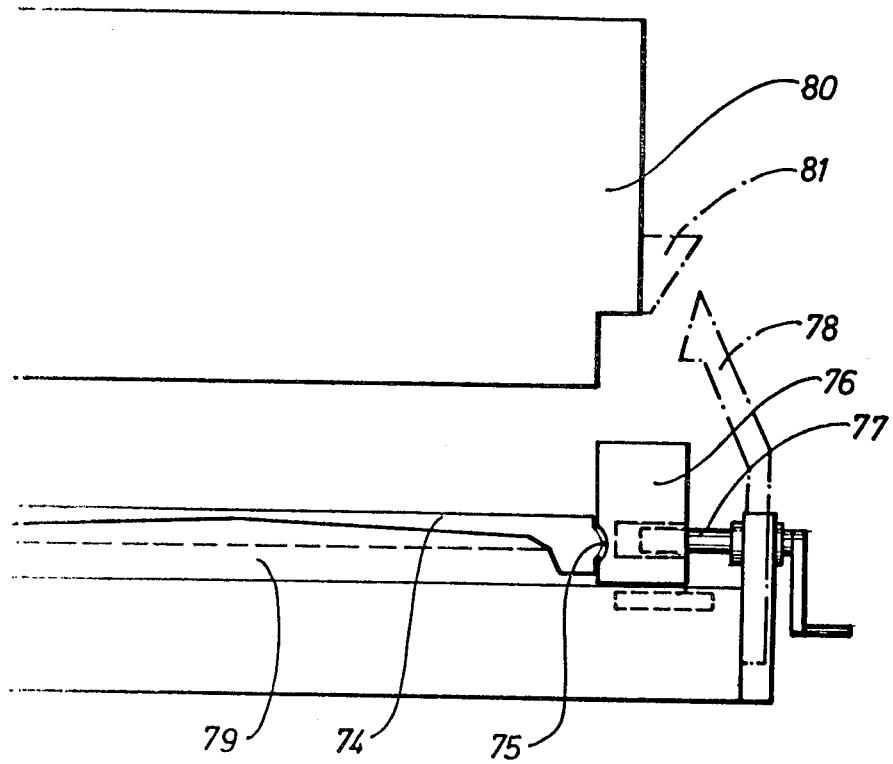
In FIGS. 12 and 13 moulds with rams operatively associated with them are shown, these moulds being intended for the production of large members preferably of relatively thin section provided with reinforcing ribs, notches and similar shaping and cross sectional changes.

In FIG. 12 a mould for a relatively thin member 74 is shown, such a member by way of example comprising a wall element with a bead along its edge. The bead exhibits a protruding portion 75, and in order to make it possible to remove the member from the mould after the casting operation, the mould is provided with lateral pieces 76, which can be moved from an inner casting position (shown in FIG. 12) to an outer position by means of a screw 77 provided with a crank. Also here is a coupling hook 78 shown, which under the bias of a spring is pivotably arranged in the bed of the lower half 79 of the mould. A ram 80 operatively associated with the mould is provided with a shoulder 81 in opposite position to the coupling hook 78. A suitable number of hooks 78 and shoulders 81 are arranged along the edge of the mould.

Figure 13:
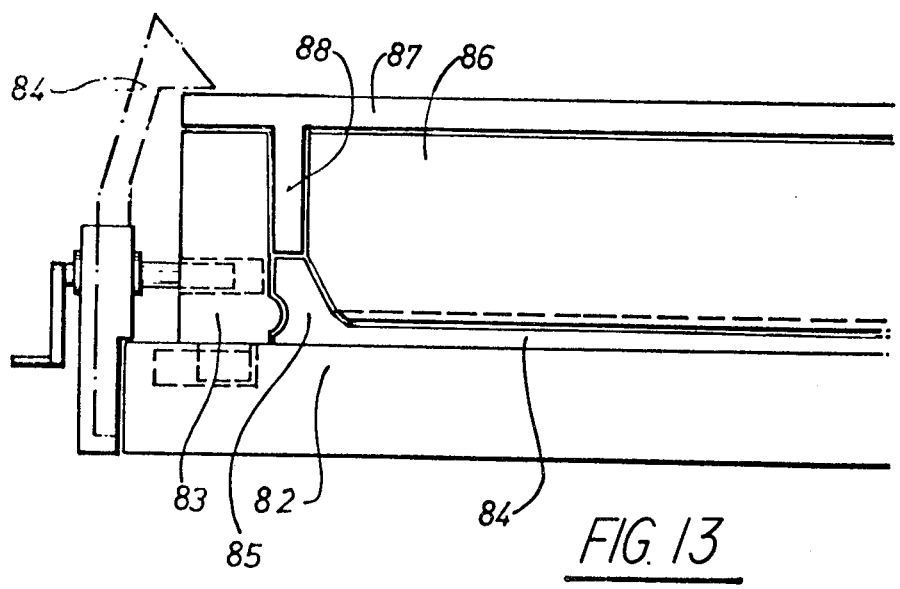

In FIG. 13 a mould is shown, which one also has a lower half 82, displaceable lateral pieces 83, and possibly also coupling hooks 84. In this case the moulded piece has a thin bottom 84a with strongly upwards projecting flanges 85. In order to make possible an adequate depth of mixture the ram associated with the mould is divided into two parts, one inner part 86, substantially covering the thin bottom 84a, and a part 87 with projecting flanges, occupying an opposite position to the flanges 85 of the casting piece.

Figure 14:
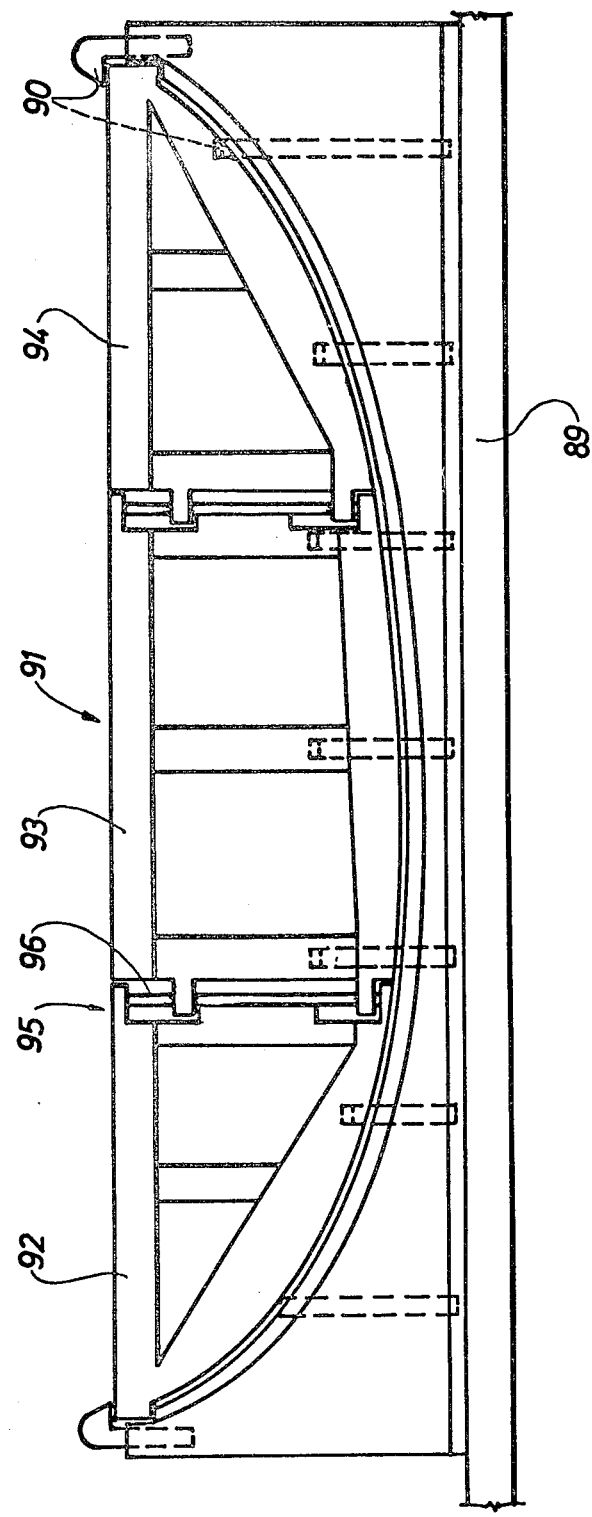
In FIG. 14 the mould and pressing tools for large plane or shell-shaped products is shown, the mould in the figure being illustrated containing the pressed hull of a boat.

The mould illustrated in FIG. 14 is intended for large casting pieces, in this particular case a hull of a boat. Also here there is a lower half 89 of the mould with a number of coupling hooks 90.

The ram 91 in this case is divided in three parts, viz. the parts 92, 93 and 94, which parts are connected with each other by means of hingelike devices 95, each one comprising a shaft 96, which extends through a number of ears in the parts 92/93 and 93/94 respectively connected with each other. The ears are arranged in such a manner that when the part 94 is pressed down, then the part 93 cannot be raised, and when this latter one is pressed down, then the part 92 cannot be raised.

Figure 15:
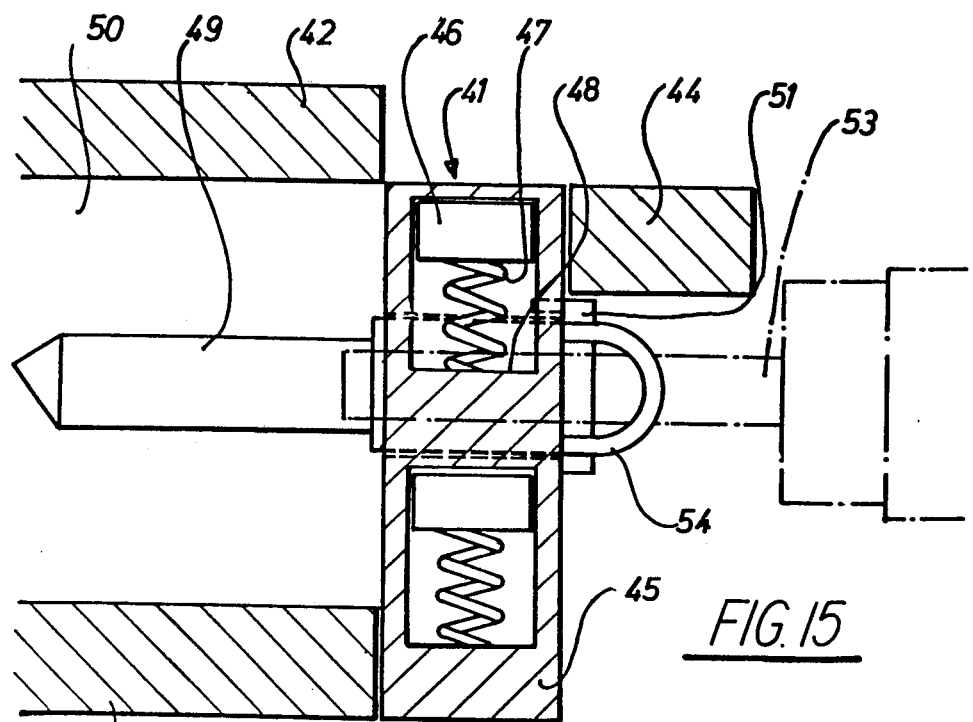
In FIG. 15 a casting mould is shown with a section of a wall of the mould exhibiting a device to provide undercutting.
Figure 16:
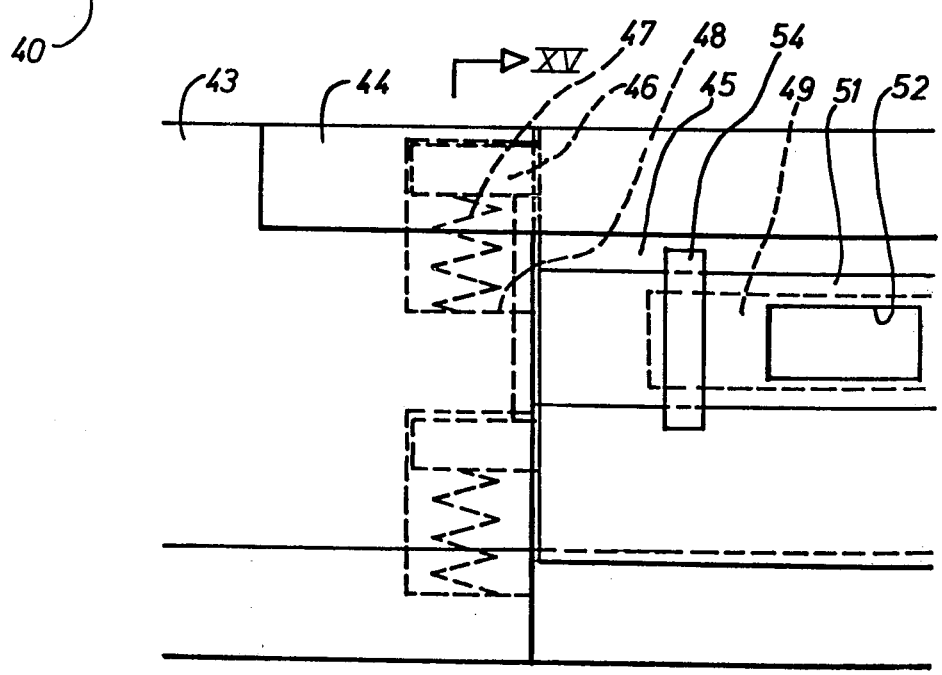
In FIG. 16 the mould of FIG. 15 is illustrated in a front view.

The mould illustrated in FIGS. 15 and 16 exhibits a bottom 40 and a mould wall 41 and a ram 42. The mould wall 41 is comprised by fixed parts 43 (of which only a portion is shown to the left in FIG. 16) with a connection member 44. Between the fixed parts 43 and placed inside the connection member 44 there is a part 45, which is movable in the direction of the pressing movement. The movable part 45 rests by virtue of shoulders 46 against springs 47, which support against the bottom of recesses in the fixed parts 43. By the bias of the springs 47 the wall portions 45 thus tend to occupy an upper position, but they can be pressed down in a lower position. The design should be clearly evident from the cross sectional view in FIG. 15 which is made along the line XV—XV in FIG. 16.

A slide 49 extends through the wall portion 45 and is provided for undercuts in the pressed piece, which are shaped in the moulding cavity 50. The slide 40 has a shoulder 51 with a hole 52 (FIG. 16) into which for example a pneumatic insertion mechanism 54 is intended to extend, and the slide is further provided with ringshaped holders for its extraction.

Figure 17:
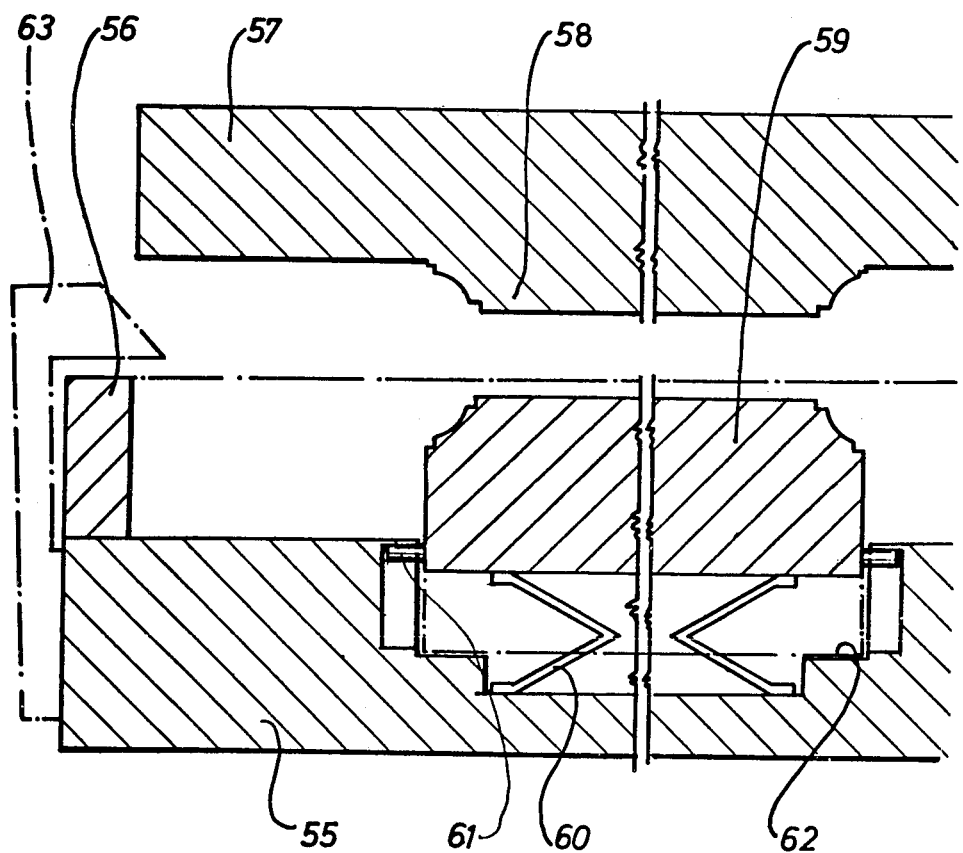
In FIG. 17 a cross section of a portion of a mould for making products of compressed mixture is illustrated, where different thickness of large or small portions is desired.

The moulding device according to FIG. 17 is intended to be used for the manufacturing of products of varying thickness. The moulding device has a bottom 55, lateral pieces 56, and a ram 57 with a protruding portion 58. Opposite to the portion 58 the bottom 55 is provided with a movable part 59, which under the bias of springs 60 tends to occupy a projected position relative to the principle surface of the bottom of the mould, which position is determined by stop pins placed in grooves 61. The shoulder 59 under pressure can be brought down into a position, where it is pressed into a recess 62 taken out in the bottom of the mould. As is to be described below it can be suitable in certain cases to provide the mould with pivotable hooks 63.

Figure 18:
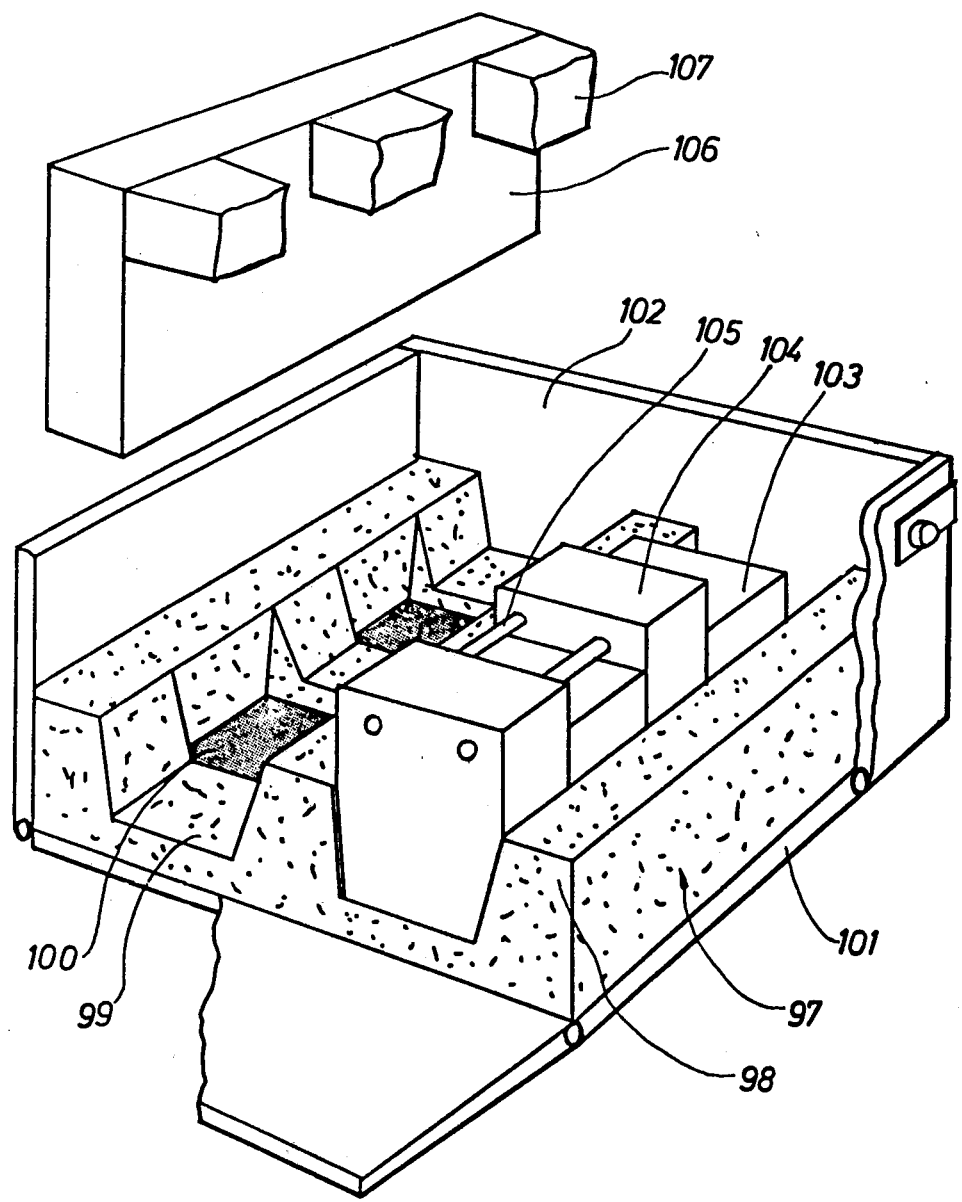
FIG. 18 shows in a broken up perspective view a pallet with a mould for the same.

In FIG. 18 a mould for a pallet 97 is shown (the pallet is shown upside down in the mould). The pallet which is made in one piece comprises three supporting beams 98 and in right angle thereto parts 99 forming the upper surface showing four openings 100. The mould has a bottom 101 and hinged thereto four lockable sides 102. To the openings 100 correspond four bodies 103 (only two are shown) extending from the bottom 101. The parts 99 are formed by means of six rampieces 104 (only two are shown) connected to each other by means of rods 105. For the pressing of the beams 98 three rampieces 106 (only one is shown) are provided. The ram pieces 106 are connected by beams 107, provided to press on the ram pieces 104 when the ram formed by the ram pieces 106 and the beams 107 is pressed down by the pressing head.

Figure 20:
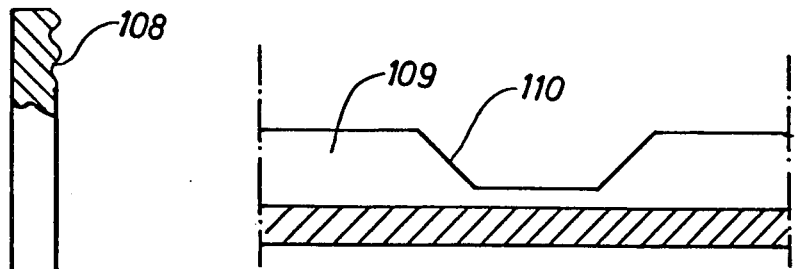
In FIG. 19 and 20 a panel for roof covering is shown in side view and a cross sectional view respectively.
Figure 19:
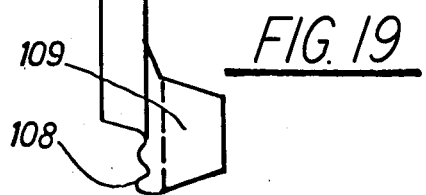

As an example of products suitable to produce by means of the method according to the invention a roof panel is shown in FIG. 19. The panel is intended to be laid directly on the roof beams and the panels are provided to be joined together by means of sealing joints 108. The panel is provided with ledges 109 intended to work as carrying elements for pan tiles. In order to make it possible for rain water under the tiles to flow downwards the ledges are provided with notches 110 (FIG. 20).

Figure 21:
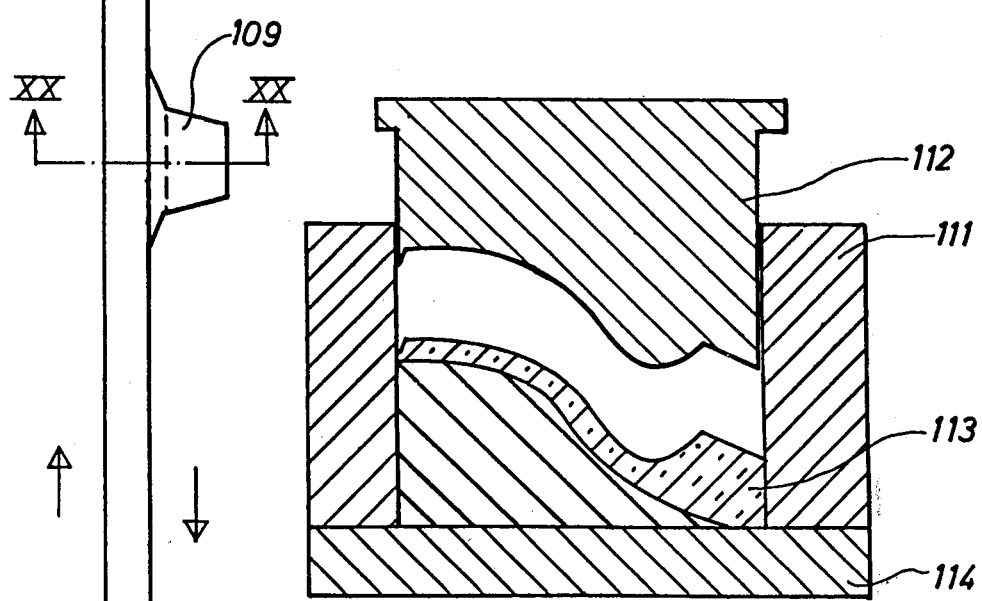
FIG. 21 shows in cross sectional view a shoe bottom in a mould provided for its manufacturing in the plastic compound mixture.

In FIG. 21 a mould 111 with a pressing head 112 is shown. The mould which preferably is made as a multiple compartment mould is provided for the manufacturing of bottoms 113 to wooden shoes in said mixture. As is evident from the figure the cavity for the shoe bottom 113 is laid in an oblique angle in relation to the resting surface 114 of the mould. By means of said vibration of the method according to the invention it is possible to direct a flow of mixture and the packing effect towards the heel of the shoe bottom 113, which will increase the strength of the heel. It is namely not possible to obtain a sufficient strength in the heel in the pressing operation in said mixture will namely depend upon the thickness in the pressing direction. However, by means of the present method it is possible to obtain a precompression of the mixture and a packing of the same between the mould and the ram during the pressing operation by means of which it is possible to obtain the desired length in all parts of the article.

As described in connection with FIG. 9 the mould can be filled with mixtures of different compositions with different characteristics according to the obtainable strength, density and so on. The different mixtures have as described before to be distributed in a suitable way according to the shape of the mould and the desired characteristics of the manufactured article. In order to obtain this selective distribution the filling will take place in several steps by using boards (37 in FIG. 9), completing the board 17, with openings (38 in FIG. 9) provided to let the mixture through. The mixture can also be precompressed. In certain cases thereby the compression can be directed to certain parts of the mould and/or to certain parts of the mixture in which the density is higher than in the remaining parts according to what is described below.

The last mentioned arrangements can be necessary to use under special circumstances e.g. by products of very complicated shape and special demands of strength. In general it is, however, not necessary to use such special arrangements by using the vibrating method according to the present invention, by means of which also products of very complicated shape can be produced.

In the foregoing it has been described only two working stations for the production of plastic or concrete products, i.e. the press with the vibrators and the hardening (curing) station. After the pressing operation in the press it is most suitable to transport the mould to the hardening station as mentioned before. Even if it is possible to fill the mould in the press before the pressing operation it can be more practical to perform the filling operation and precompression by means of vibrating before the pressing operation in separated stations and to move the mould stepwise from station to station. In this case at least the precompression station has to be provided with vibrators of the kind decribed in connection with FIGS. 4–8.

By using a mould according to FIGS. 15, 16 the slide 49 is drawn out during the filling operation. Before the pressing, the slide 49, is now preferably displaced and pushed into the compound in its upper position, which is facilitated by the pointed end of the slide. Thereafter the pressing cycle is taking place by moving down the pressing head 42 and the slide 49 following in the downwards direction, said slide occupying its intended final lower position when the compound below the slide has reached the intended thickness. Thus the compound is compressed in the mould cavity in an unbroken layer sidewise of the slide by means of the head but under the slide by means of the slide itself, which during its downward movement compresses the underlying compound, while compound above the slide can be compressed between the slide and the pressing head. A slide not vertically displaceable would hinder the compound of particles below the slide to be compressed to a sufficient degree.

In the mould shown in FIG. 17 the piece 59 supported under bias of a spring is in its upper position illustrated in the figure, when the mould is filled. When some of the compound is scraped off by way of example flush with the sidewalls 56, only an insignificant quantity of compound is obtained above the piece 59, and the depth of the compound is here adjusted so that a proportionally equally strong pressing is obtained therein as in the thicker portions.

When producing a pallet 97 according to FIG. 20 the side walls 102 of the mould are raised and locked together. The bottom of the mould cavity is forming a plane with the four bodies 103 erecting therefrom. The mould is now connected to the board 17 and the compound filled in the same layer suitable to form the parts 99. Thereafter the six ram pieces 104 are inserted in the mould and a new layer of compound, suitable to form the beams 98 is filled in the mould in the areas left behind the bodies 103 and the ram pieces 104. Before the pressing operation the ram 106, 107 is inserted in the mould. By pressing down the same it will press down the ram pieces 104 by means of the parts 107. By adjusting the distance between the underside of the ram pieces 106 and the underside of the parts 107 to the height of the ram pieces 104 it is possible to obtain a suitable compression of the different parts of the pallet 97.

When manufacturing the roof panel in FIGS. 19, 21 it is important to reach a high strength in the ledges 109 which is difficult because of the larger thickness of the same according to the thickness in the remaining part of the panel. However, by means of the vibrating method according to the present invention it is possible to produce a force sideways in relation to the pressing direction, which is from the left to the right in FIG. 21, i.e. in the direction parallel to the main extension of the panel. Thereby it is possible to obtain a higher pressure in the ledges 109 than what is obtainable by means of only the pressing pressure. The suitable direction of the force produced by the vibrators of the mould is indicated by means of an arrow to the right in FIG. 18 whereby the direction of the force from the ram is reverse, according to the arrow to the left.

The spring biased hook e.g. in FIGS. 12, 13 are arranged to hold the ram brought down against the rest of the mould with a force corresponding a certain part of the piece to be pressed. This springing pressure is maintained during the thermosetting of the plastic material. The spring biased hooks shall be used when water-soluble binders are used, for example urea plastics, so that the steam created during the thermosetting process as a possibility to escape by the ram being pressed somewhat in upwards direction.

In conventional methods it has been necessary to ease the pressure one or several times during the thermosetting process in order to let the steam escape, which has resulted in rather rough portions of the surfaces of the products, which portions have had to be removed in a finishing operation.

The positions of the vibrators 28, 29 may be changed, as illustrated with an x (see FIGS. 5 and 6) indicated at 281 and 291 respectively, and directed according to the arrows shown.

It is to be appreciated that the foregoing description has been set out by way of example, not by way of limitations. Numerous other embodiments and variants are possible with the scope of this invention, its scope being defined in the appended claims.

What is claimed is:

1. A method of forming an article of complicated shape from a mixture of a solidifying plastic compound and a relatively large portion of filling material, comprising introducing the mixture to a predetermined level into a mould, adapted to the shape of one side of the the article, through an opening from which the cavity of the mould is directly accessible, inserting a ram adapted to the shape of the other side of the article into said opening, placing said mould in an apparatus including power means provided to press the ram into the mould and vibrating means provided to subject the mound and the ram to vibrations, in which method the pressing and vibrating is made in the following cycle:

subjecting the ram to a force of a first pressure level by means of said power means for pressing the ram into the mould;

subjecting the mould to at least two sets of frequency-synchronous, mutually phase-offset vibrations, each set being produced by at least one vibrator, including a first set of vibrations having a first component aligned with the direction of pressure applied to the ram relative to the mould and a second component in a first direction transverse to said direction of pressure, and a second set of vibrations having a first component aligned with said direction of pressure and a second component in a second direction transverse to said direction of pressure and also crosswise to the direction of said second component of said first set of vibrations;

while said mould is thus subjected to vibrations, subjecting the ram to at least two sets of frequency-synchronous phase-offset vibrations, each set being produced by at least one vibrator, and each having a first component aligned in the said direction of pressure and a second component in a direction transverse to said direction of pressure, said sets of vibrations and the components thereof to which the ram is subjected being opposite in direction and equal in frequency, and hence opposite in phase, respectively to said sets of vibrations and the components thereof to which the mould is subjected;

maintaining the pressure of said first level of force and said vibrations until the resulting shifting of particles has distributed said mixture in said mould cavity in a mass adapted to the complicated shape of the article, and subjecting the ram to a force of a second and increased pressure level while continuing said vibrations, so that the mixture becomes compressed in its distributed form.

2. A method as defined in claim 1, in which said first and second components of vibration are substantially in quadrature phase-offset relation to each other in the case of the vibrations of each of said sets of vibrations.

3. A method as defined in claim 2, in which the vibrations of said first set of vibrations and the vibrations of said second set of vibrations have the same frequency and, with respect to their respective components aligned with said direction of pressure, are offset from each other in phase.

4. A method as defined in claim 3, in which the offset in phase between the respective components aligned with the said direction of pressure of the first and second set of vibrations are in phase opposition.

5. A method as defined in any of claims 1–4, in which, during or after the introduction of said mixture into said mould, and before said ram is subjected to pressure with respect to said mould, said mould is subjected to vibrations in the same manner as during the application of said force to said ram.

6. A method according to claim 1, in which a plurality of mixtures of different density are introduced into the mould.

7. A method according to claim 1, in which during the introduction of said mixture into said mould, an apertured board is located above the mould opening, and said mixture is fed through the aperture or apertures in the board into the mould adjacent the side walls of the mould.

8. A method of forming an article of complicated shape from a mixture of a solidifying plastic compound and a relatively large portion of filling material, comprising introducing the mixture to a predetermined level into a mould, adapted to the shape of one side of the article, through an opening from which the cavity of the mould is directly accessible, inserting a ram adapted to the shape of the other side of the article into said opening, placing said mould in an apparatus including power means provided to press the ram into the mould and vibrating means provided to subject the mould and the ram to vibrations, in which method the pressing and vibrating is made in the following cycle:

subjecting the ram to a force of a first pressure level by means of said power means for pressing the ram into the mould;

subjecting the mould to at least two sets of frequency-synchronous, mutually phase-offset vibrations, each set being produced by at least one vibrator, including a first set of vibrations having a first component aligned with the direction of pressure applied to the ram relative to the mould and a second component in a first direction transverse to said direction of pressure, and a second set of vibrations having a first component aligned with said direction of pressure and a second component in a second direction crosswise to said direction of pressure and also transverse to the direction of said second component of said first set of vibrations;

while the mould is thus subjected to vibrations, subjecting the ram to at least two sets of frequency-synchronous, mutually phase-offset vibrations, each set being produced by at least one vibrator, including a third set of vibrations having a first component aligned in the said direction of pressure and a second component in said first direction transverse to said direction of pressure, and a fourth set of vibrations having a first component aligned in said direction of pressure and a second component aligned in said second direction transverse to said direction of pressure, the frequency of the vibrations of said third set and that of the vibrations of said fourth set being different from the frequency of the vibrations of said first set and from the frequency of vibrations of said second set;

maintaining the pressure of said first level of force and said vibrations until the resulting shifting of particles has distributed said mixture in said mould cavity in a mass adapted to the complicated shape of the article, and subjecting the ram to a force of a second and increased pressure level while continuing said vibrations, so that the mixture becomes compressed in its distributed form.

9. A method as defined in claim 8, in which said first and second components of vibration are substantially in quadrature phase relation to each other in the case of the vibrations of each of said sets of vibrations.

10. A method as defined in claim 8 or claim 9, in which the frequency of the vibrations of said second set is different from that of the vibrations of said first set and in which the frequency of the vibrations of said fourth set is different from the frequency of the vibrations of said third set.

11. A method as defined in claim 8, in which, during or after the introduction of said mixture into said mould, and before said ram is subjected to pressure with respect to said mould, said mould is subjected to vibrations in the same manner as during the application of said force to said ram.

12. A method according to claim 8, in which a plurality of mixtures of different density are introduced into the mould.

13. A method according to claim 8, in which during the introduction of said mixture into said mould, an apertured board is located above the mould opening, and said mixture is fed through the aperture or apertures in the board into the mould adjacent the side walls of the mould.

14. A method of forming an article of complicated shape from a mixture of solidifying plastic compound and a relatively large portion of filling material, comprising introducing the mixture to a predetermined level into a mould, adapted to the shape of one side of the article, through an opening from which the cavity of the mould is directly accessible, inserting a ram adapted to the shape of the other side of the article into said opening, placing said mould in an apparatus including power means provided to press down the ram into the mould and vibrating means provided the mould and the ram to vibrations, in which method the pressing and vibrating is made in the following cycle:

subjecting the ram to a force of a first pressure level by said power means for pressing the ram into the mould;

subjecting the mould to at least two sets of vibrations each produced by at least one eccentric-mass rotary vibrator of which the axis is perpendicular to the direction of pressure applied to the ram relative to the mould, the vibrator axis of rotation for a first one of said sets of vibrations being oriented substantially at right angles to the vibrator axis of rotation for a second of said sets of vibrations, while said mould is thus subjected to vibrations, subjecting the ram to at least two sets of vibrations, including a third and a fourth set, each produced by at least one eccentric-mass rotary vibrator, the axes of rotation of said vibrators for said ram being parallel to the respective axes of rotation of said vibrators for said mould;

maintaining the pressure of said first level of force and said vibrations until the resulting shifting of particles has distributed said mixture in said mould cavity in a mass adapted to the complicated shape of the article, and subjecting the ram to a force of a second and increased pressure level while continuing said vibrations, so that the mixture becomes compressed in its distributed form.

15. A method as defined in claim 14, in which the respective frequencies of the vibrations of said sets are equal, and in which the respective components in said direction of pressure of said first and second sets of vibrations are in phase opposition and in which the components in said direction of pressure of each group of said vibrators for the mould having parallel axes of rotation are in phase. opposition with the conponents in said direction of pressure of said vibrators for the ram having axes parallel thereto, while the components of said vibrations transverse to said direction of pressure of parallel-axis vibrators respectively for the mould and for the ram are also in phase opposition.

16. A method as defined in claim 14, in which the respective frequencies of vibrations of said third and fourth sets of vibrations are different from the respective frequencies of vibrations of said first and second sets of vibrations, as the result of operation of vibrators at different rotary speeds.

17. A method as defined in claim 16, in which the respective frequencies of vibrations of said first and second sets of vibrations are different, and in which the respective frequencies of vibrations of said third and fourth sets are different.

18. A method as defined in claim 14, in which during or after the introduction of said mixture into said mould, and before said ram is subjected to pressure with respect to said mould, said mould is subjected to vibrations in the same manner as during the application of said force to said ram.

19. A method according to claim 14, in which a plurality of mixtures of different density are introduced into the mould.

20. A method according to claim 14, in which during the introduction of said mixture into said mould, an apertured board is located above the mould opening, and said mixture is fed through the aperature or apertures in the board into the mould adjacent the side walls of the mould.

* * * * *

UNITED STATES PATENT AND TRADEMARK OFFICE
CERTIFICATE OF CORRECTION

PATENT NO. : 4,226,820

DATED : October 7, 1980

INVENTOR(S) : GEORG. BJORHAAG

It is certified that error appears in the above—identified patent and that said Letters Patent is hereby corrected as shown below:

In column 4, line 22, "three forward" should be --these forward--.

Signed and Sealed this

Eighteenth Day of August 1981

[SEAL]

Attest:

GERALD J. MOSSINGHOFF

Attesting Officer

Commissioner of Patents and Trademarks